United States Patent
Luna

(10) Patent No.: US 9,415,899 B2
(45) Date of Patent: Aug. 16, 2016

(54) TRANSPARENT SILICONE COVER FOR THE SAFEGUARDING OF GLASS PHARMACEUTICAL VIALS

(71) Applicant: Andrew Isaac Luna, Keller, TX (US)

(72) Inventor: Andrew Isaac Luna, Keller, TX (US)

( * ) Notice: Subject to any disclaimer, the term of this patent is extended or adjusted under 35 U.S.C. 154(b) by 4 days.

(21) Appl. No.: 14/588,912

(22) Filed: Jan. 3, 2015

(65) Prior Publication Data

US 2016/0194114 A1    Jul. 7, 2016

(51) Int. Cl.
*B65D 25/00*    (2006.01)
*B65D 23/08*    (2006.01)

(52) U.S. Cl.
CPC .................... *B65D 23/0871* (2013.01)

(58) Field of Classification Search
CPC ........... B65D 23/0871; B65D 23/0857; B65D 23/0842; B65D 81/03; B65D 81/3876; B65D 81/3879; B65D 81/3888; B65D 81/389; B65D 81/3886; Y10S 150/901
See application file for complete search history.

(56) References Cited

U.S. PATENT DOCUMENTS

| | | | |
|---|---|---|---|
| 218,297 A * | 8/1879 | Marks | B65D 23/0842 229/89 |
| 4,948,000 A | 8/1990 | Grabenkort | |
| 7,334,698 B2 | 2/2008 | Tobias | |
| 2005/0103795 A1 | 5/2005 | Hall et al. | |
| 2006/0231562 A1 | 10/2006 | Carroll | |
| 2009/0101659 A1 | 4/2009 | Morlan | |
| 2009/0107947 A1 | 4/2009 | Knaack | |
| 2013/0020223 A1 | 1/2013 | White | |
| 2014/0048509 A1* | 2/2014 | O'Brien | B65D 23/0857 215/386 |

\* cited by examiner

*Primary Examiner* — Jeffrey Allen

(57) ABSTRACT

A transparent silicone cover and accompanying transparent silicone securing bands that safeguard a glass pharmaceutical vial from shattering or cracking as a result of handling by automated dispensing units, patients, or medical or veterinary staff while simultaneously allowing inspection and reading of an enclosed vial, its contents and all labels in their entirety, as well as scanning of barcodes in the clinical setting. The main body provides a cylindrical lumen for the vial to rest in securely while effectively protecting the vial's sidewalls and base. One side of the main body has a narrow slit from top to base which also extends inwardly partially across the base, allowing the main body to flex open, offering easy insertion and removal of a vial. The transparent silicone securing bands fit tightly over the main body to further safeguard the enclosed vial. The entire assemblage is autoclavable, hypoallergenic, microbe resistant, removable and reusable.

2 Claims, 4 Drawing Sheets

TRANSPARENT SILICONE COVER FOR THE SAFEGUARDING OF GLASS PHARMACEUTICAL VIALS

BACKGROUND OF THE INVENTION

My invention serves to provide a transparent protective cover for glass pharmaceutical vials to be implemented in hospitals, pharmacies, clinics and the like, as well as provide a transparent protective cover for patients' own medications stored within glass pharmaceutical vials in the home setting.

A glass pharmaceutical vial is a glass vessel or bottle of varying shapes and sizes, often used to store medications in the form of liquids, powders, and gels, as well as tablets, caplets or capsules. They can also be used as scientific sample vessels; for instance, in auto-sampler devices used for analytical chromatography.

A glass pharmaceutical vial can be tubular, have a bottle-like shape with a neck, or exist in segmented Act-O-Vial or ampoule forms. The bottom of a glass pharmaceutical vial is usually flat, unlike test tubes, which usually have a rounded bottom. Several different methods are used to close the top of glass pharmaceutical vials, including a screw cap or threaded dropper/pipette, a cork or plastic stopper, or a rubber stopper with a securing metal cap.

Vial-like glass containers date back to classical antiquity. Glass pharmaceutical vials have been implemented universally in both human and veterinary medicine as a means of medication storage due to the chemistry of many medications and the potential for vials made of other materials to negatively interact with the contained medications. Glass pharmaceutical vials prevent many chemical interactions and have proven to be an effective means of containing a vast array of medications.

Glass, however, does present a set of issues that do require attention. These issues stem primarily from glass being fragile and easily breakable. This poses a threat to the safety of medical and veterinary staff and their patients. Shattered glass pharmaceutical vials may result in injury to patients or professional staff related to direct contact with the resulting sharp edges of shards of the broken glass pharmaceutical vial. Additionally, direct skin contact with a potentially hazardous substance that is otherwise contained within the unbroken glass pharmaceutical vial may result in a dangerous reaction to a person's skin or bodily systems. Furthermore, cracked yet intact glass pharmaceutical vials may allow pathogens to enter the glass pharmaceutical vial and impair the integrity of the medication, which may lead to medical or veterinary professionals and their patients being at risk for hospital acquired conditions.

Another issue presented by fragile glass pharmaceutical vials that might easily be broken is the cost of replacing the medications lost due to a shattered glass pharmaceutical vial. This has proven to be quite costly for patients and hospitals, with the cost of some medications reaching upwards of about $30,000 per vial, such as H.P. Acthar.

Additionally, glass is significantly more costly than plastic in terms of materials used, processes to manufacture and packaging required to ensure against breakage during handling/shipping/delivery.

While a variety of protective glass container devices exist and are in use today, it can be seen that many improvements in the field are desired.

Typical previous solutions related to the problem of glass container breakage have included variations of a continuous cylindrical shape made of resilient material into which the container is inserted (e.g. Tobias patent #7334698 or Knaack application #2009/0107947 or Morlan application #2009/0101659 or Grabenkort patent #4948000) as well as variations of a flat shaped sheet of material that is meant to be wrapped around a container (e.g. Carroll application #2006/0231562 or White application #20130020223 or Hall et. al. application #2005/0103795)

Much of the prior art is lacking in a complete covering of the glass pharmaceutical vial due to either viewing windows or ornamental portals designed into the side wall, or the complete lack of material covering the bottom of the glass pharmaceutical vial, thus failing to effectively protect the glass pharmaceutical vial in its entirety. Neither does the prior art include a design that allows the clear and undistorted viewing of the glass pharmaceutical vial in its entirety as well as medication labels and substances contained within the glass pharmaceutical vial without compromising any protective features. Neither does the prior art include a design that allow for scanning of barcodes that may be attached to the glass pharmaceutical vial, or viewing and scanning of additional hospital placed labeling that may contain specific data related to any instance of a glass pharmaceutical vial (i.e. patient info, dosage info, what medication it contains, safe handling and disposal information, etc.). Furthermore, hospital labels tend to be lengthy, and in this instance my invention would allow said label to be extended through the slit in the sidewall to allow for clear and easy viewing of said label in its entirety. This feature provides convenience to medical and veterinary staff and their patients as opposed to needing to wrap the label around the glass pharmaceutical vial before insertion into a protective cover and subsequent removal of the vial cover to unwrap and read said label.

Prior art does not sufficiently address the process of an easy insertion and removal of the glass pharmaceutical vial necessary to maintain safe and efficient handling of the glass pharmaceutical vial. Many provide for a sliding insertion/removal process which does not ensure a secure containment of the glass pharmaceutical vial. Neither does the prior art allow for the use of a single protective sleeve for a variety of shapes/sizes of glass vials. Others provide a separate cover or cap to be secured to a lower cylindrical shaped container, creating additional and unnecessary complications in the number of parts required to make-up a complete protective device, thus creating inventory complications due to a multitude of parts and the necessity of stocking matching parts in order to complete the protective sleeve device. Others are characterized by a self-limiting nature in regard to accommodating various sizes and shapes of glass pharmaceutical vials due to their unyielding structure and design.

What is required for improved protection from breakage of glass vials is a device and method whereby the glass pharmaceutical vial is sufficiently surrounded by a transparent, resilient material so as to not allow any hard surface to directly contact the glass material making up the pharmaceutical vial. Ideally, this transparent, resilient protective device should provide a means of protection for glass pharmaceutical vials in an efficient and appropriate manner while meeting additional needs of its users such as medical and veterinary professionals in the clinical setting as well as patients in the home setting. It should allow for easy insertion, secure containment and easy removal of the glass pharmaceutical vial. It should furthermore accommodate a reasonable variance in size and/or shape of contained glass pharmaceutical vials to minimize the need for a design specific to each of the many glass pharmaceutical vial shapes and sizes currently available on the market. It should allow for scanning of glass pharmaceutical vial barcodes in the clinical setting. It should accommodate placement and clear and undistorted viewing of hospital placed labels. It should allow for safe storing of glass pharmaceutical vials in automated dispensing units. It should allow for autoclaving and reuse of the cover. It should be hypo allergenic and microbe resistant. It should protect the glass pharmaceutical vial and its contents from infiltration of pathogens and subsequent impairment of their integrity. It should reduce cost for the clinic and the patient related to unnecessary repeat purchases of medications lost as a result of shattering or cracking of glass pharmaceutical vials. It should allow for clear and undistorted viewing of the glass pharmaceutical vial contents as well as any markings on the glass pharmaceutical vial that may indicate the name of the contents, the concentration of the contents, the level of the remaining contents, the patient to whom it is assigned, the inventory control features, and other indicia as required in the industry.

None of the prior art discloses or addresses all of these issues which are resolved by my invention, nor do they afford the benefits specifically designed into my invention.

BRIEF SUMMARY OF THE INVENTION

My invention is a transparent silicone cover that will be comprised of a main piece, defined as a hollow cylinder with a wide lumen and an integral base with a narrow lumen. The main cylindrical piece will have a slit on one side from top to bottom and extending to the circumferential outer edge of the narrow lumen in the base, so as to allow for opening/distortion of the cover and base to ease the insertion of a glass pharmaceutical vial. It will be provided with transparent silicone bands that will fit over the cover to further secure it in place and help to provide protection of the vast array of shapes and sizes of glass pharmaceutical vials available or in use by ensuring that the main body remains securely in place when a vial is inserted. It will be available in a few accommodating sizes such that one size will fit many glass pharmaceutical vials of relatively similar height and circumference. The entire assemblage is removable, autoclavable and reusable.

This invention serves to protect glass pharmaceutical vials from shattering or cracking, thus improving the safety of patients and medical and veterinary professionals by avoiding potential injuries as a result of contact with sharp glass or direct contact with spilled contents, and preventing hospital acquired conditions as a result of infiltration of pathogens into a cracked but intact glass pharmaceutical vial. Further, my invention provides for the easy insertion and removal of a glass pharmaceutical vial into its transparent protective sleeve. My invention is designed such that one size fits many, meaning a single inventory item will fit around and provide protection to a range of shapes and/or sizes of vials, rather than only a single shape or size vial. Most pharmaceutical vials range from 1 mL to 250 mL and exist in tubular, bottle-shaped with a neck, or even segmented Act-O-Vial or ampoule forms. Each of these varying shapes, as well as vials of differing but similar sizes, may be accommodated by one cover in accordance with my invention. Inherently, the proposed invention serves to simultaneously reduce patient and hospital costs related to medications lost as a result of shattered glass pharmaceutical vials.

In its preferred embodiment, my invention is made of transparent silicone, which provides for a clear and undistorted visual inspection of the contained glass pharmaceutical vial to surmise the level of remaining contents, and any labeling or barcode attached to the glass pharmaceutical vial. Such transparency will also allow for the scanning of barcodes in the clinical setting. The properties of silicone also provide for the ability to autoclave the protective cover in its entirety, provide stability when in contact with many chemicals and substances, and provide microbe resistance while remaining hypo allergenic.

An object of the present invention is to provide protection from breakage of glass pharmaceutical vials by covering the entire side as well as the majority of the bottom of the glass pharmaceutical vial with a transparent, resilient material that has shock absorbing properties.

A further object of the present invention is to provide safe and easy insertion and/or removal of a glass pharmaceutical vial from the protective sleeve device.

A further object of the present invention is to provide a protective sleeve that surrounds and provides protection to more than a single size/shape of glass vial which will reduce the number of different items required to inventory in order to protect the variety of glass pharmaceutical vials in use.

A further object of the present invention is to allow a clear and undistorted viewing of the contained/protected glass pharmaceutical vial, its contents and any labeling on the glass pharmaceutical vial.

A further object of the present invention is to provide a reusable protective covering for glass pharmaceutical vials, reducing costs as compared to replacing a 'one use/disposable' device.

A further object of the present invention is to prevent the shattering of glass pharmaceutical vials and the subsequent costly, preventable, and time consuming repeat purchases of medications and glass pharmaceutical vials.

A further object of the present invention is to increase the safety of patients, medical and veterinary staff and professional employees by protecting against the danger of injury by the sharp edges of broken glass, as well as to prevent harm as a result of making contact between their skin/body and the materials contained within the glass pharmaceutical vials.

A further object of the present invention is to provide a protective covering that allows for safe storage of glass pharmaceutical vials in automated dispensing units without the risk of shattering as a result of constant opening and closing of drawers of said automated dispensing units.

A further object of the present invention is to accommodate for placement and clear and undistorted viewing of hospital printed labels.

A further object of the present invention is to provide a protective covering that is hypoallergenic, provides microbe resistance, and allows for autoclaving of the cover in its entirety.

A further object of the present invention is to provide a protective covering that allows for scanning of the contained glass pharmaceutical vial's barcode in the clinical setting.

A further object of the present invention is to improve safety by preventing the partial cracking of glass pharmaceutical vials and thus decreasing the subsequent risk of infiltration of pathogens into medications contained within glass pharmaceutical vials, thereby also decreasing the risk of illness or hospital acquired conditions among patients and medical or veterinary professionals.

DETAILED DESCRIPTION OF THE INVENTION

Figure 1:
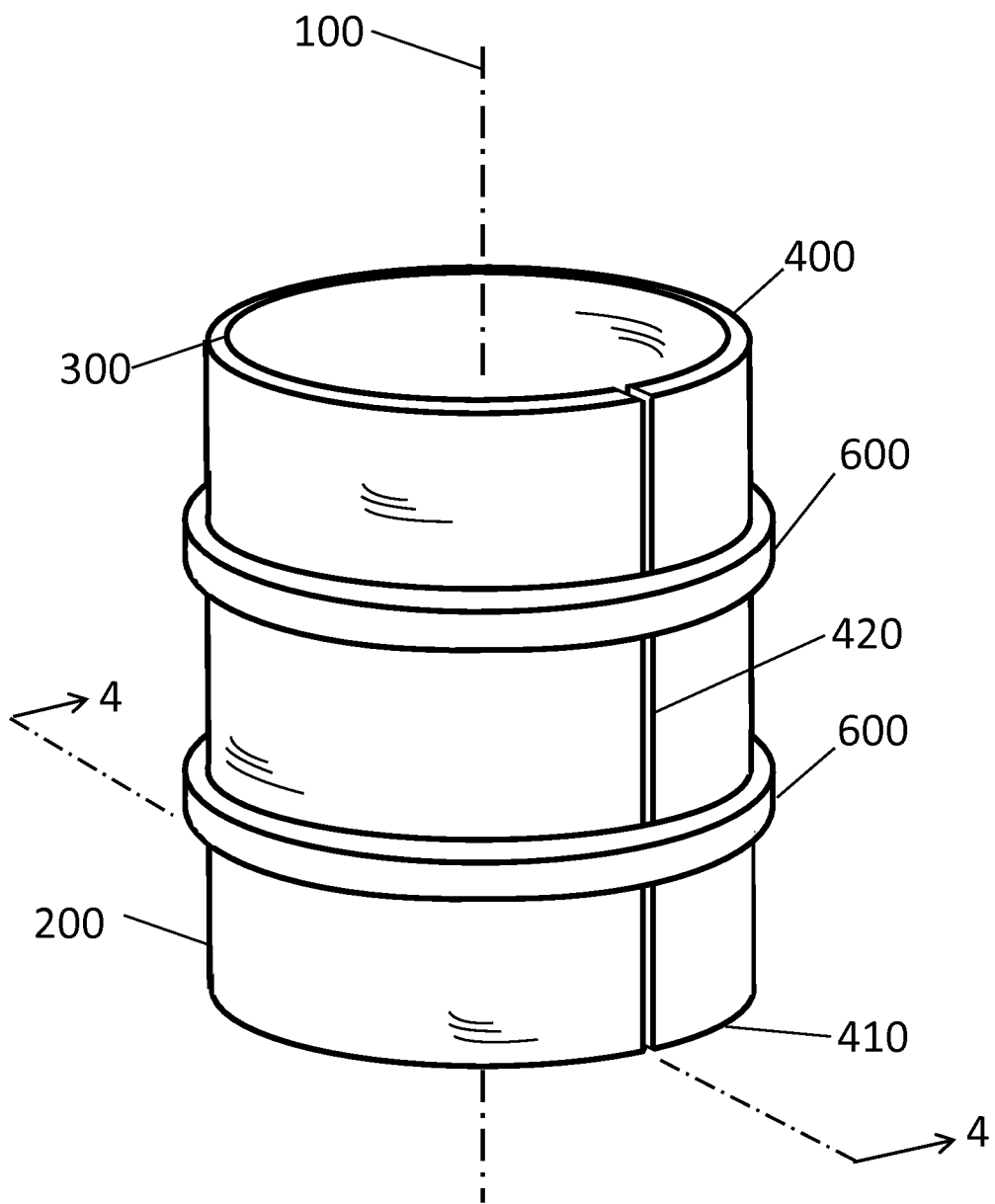
FIG. 1 shows a 3 dimensional perspective of a typical embodiment of my invention.
Figure 2:
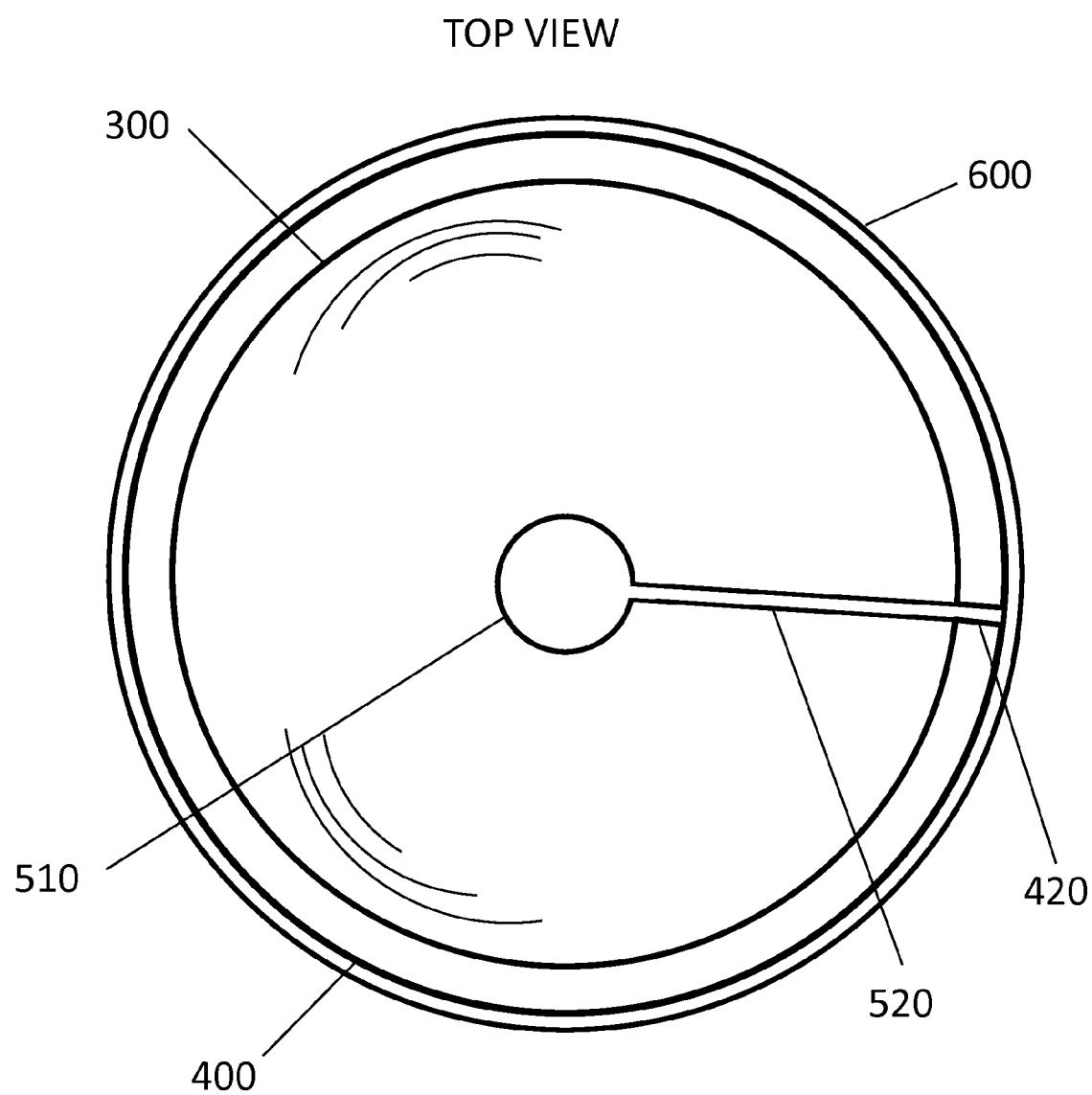
FIG. 2 shows a top view of my invention.
Figure 3:
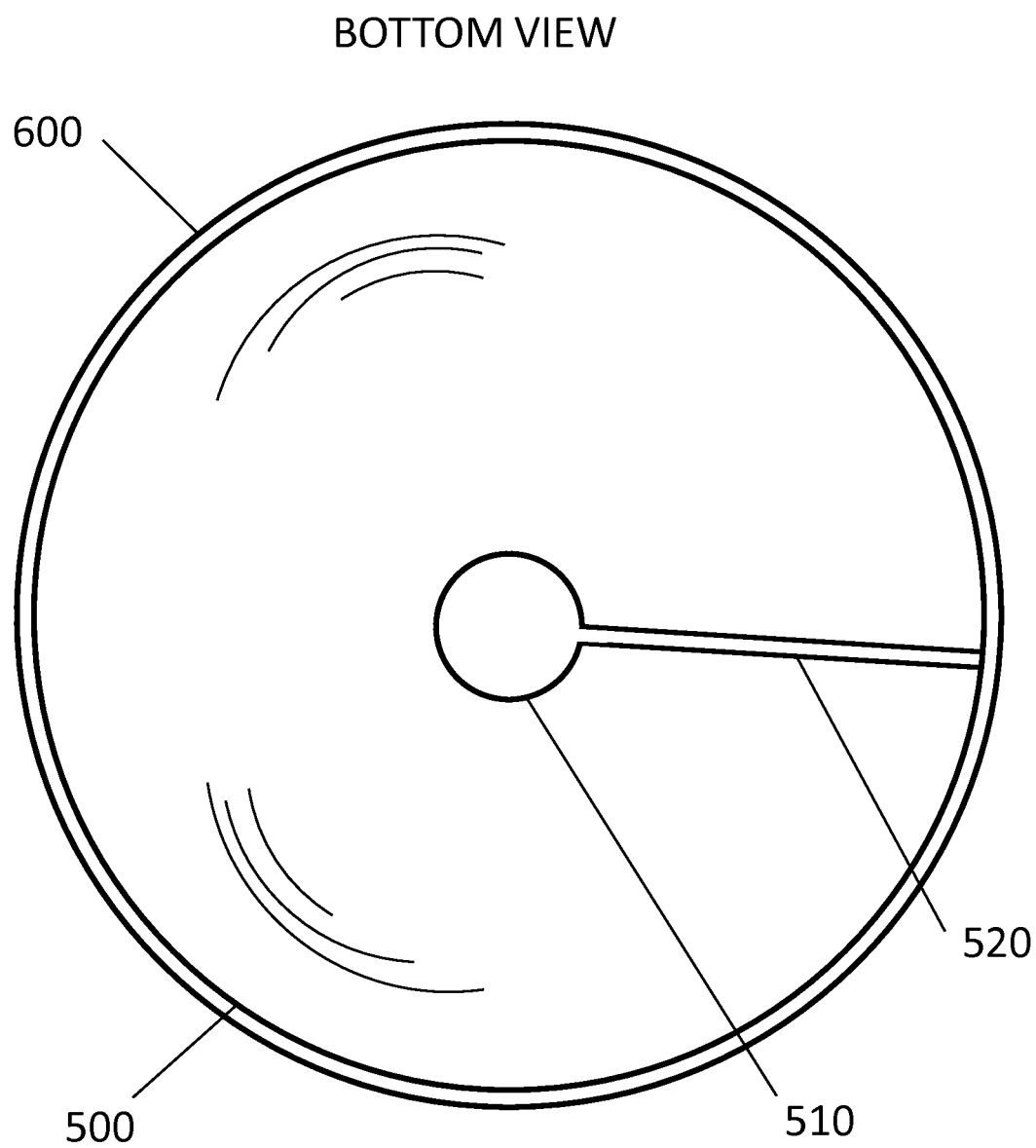
FIG. 3 shows a bottom view of my invention.
Figure 4:
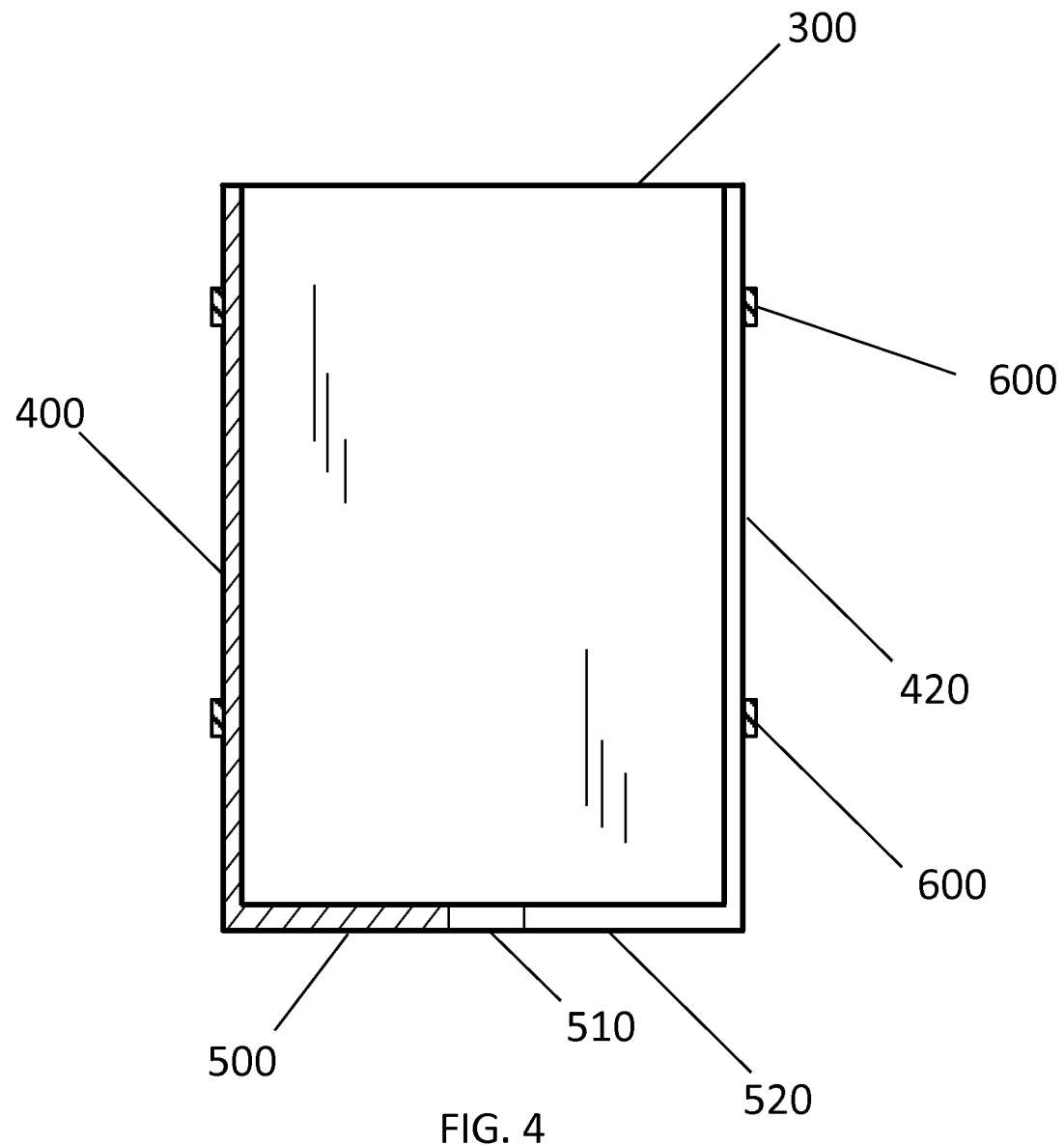
FIG. 4 shows a section view of my invention, the section being taken in a plane that passes both through the primary axis (100) of the main cylindrical body (200) and the circumferential side wall slit (420) that is in the circumferential side wall (400) and the base slit (520) in the base (500).

In the preferred embodiment, my invention is a transparent silicone cover that will be comprised of a main piece, defined by a hollow cylinder with a wide lumen and a base with a narrow lumen. The main cylindrical piece will have a slit on one side from top to bottom and extending across the base to the outer circumferential edge of the narrow lumen in the base, so as to allow for opening of the cover and ease the insertion/removal of a glass pharmaceutical vial. It will be provided with transparent silicone bands that will fit over the cover to further secure the cover tightly around the glass pharmaceutical vial and further safeguard the glass pharmaceutical vial contained within the cylindrical void formed by the closed cover and integral base.

In use, the slit provides for flexion of the transparent silicone cylindrical covering to easily accommodate insertion of a glass pharmaceutical vial. Once flexed to an open position, the glass pharmaceutical vial is placed within the transparent silicone cylindrical covering which then returns to a closed position in which the glass pharmaceutical vial's sidewalls in their entirety, as well as a majority of the bottom of the glass pharmaceutical vial, are effectively covered and protected from shattering. The transparent silicone bands are then stretched around the outer circumference of the cylindrical cover and released in order to tighten against the cylindrical cover with the glass pharmaceutical vial held securely within.

It is to be understood that beyond the herein described preferred embodiment of my invention, which has been presented here as an illustration for understanding in general terms the benefits, characteristics and advantages that its design affords, further embodiments or details are claimed to be protected as well as they fall within the scope and spirit of the broad wording and understanding of the claims herein attached.

I claim:

1. A transparent, silicone, protective vial cover, comprising
    a primary axis (100), and
    a main cylindrical body (200), and
    a circular top opening (300), and
    a circumferential side wall (400), and
    a lower end (410) of said circumferential side wall (400), and
    a base (500) extending perpendicular to said primary axis (100), and
    a circular base opening (510) in said base (500), and
    a circumferential side wall slit (420) in said circumferential side wall (400) of said main cylindrical body (200), and
    a base slit (520) in said base (500), and
    clear silicone bands (600), and
    said primary axis (100) passes through the radial center of said circular top opening (300) and the radial center of said circular base opening (510), and
    said base (500) is integral with said circumferential side wall (400) at said lower end (410) of said circumferential side wall (400), and
    said circumferential side wall slit (420) corresponds circumferentially to said base slit (520) at said lower end (410) of said circumferential side wall (400), and
    said main cylindrical body (200) is deformable outwardly away from said primary axis (100) at said circumferential side wall slit (420) and said base (500) is deformable at said base slit (520), and
    said clear silicone bands (600) are placed so as to surround and tighten against said circumferential side wall (400) such that said transparent silicone protective vial cover receives a glass pharmaceutical vial within said circumferential side wall (400) and said base (500),
    said circumferential side wall (400) substantially covers side walls of said received glass pharmaceutical vial, and extends past a top of said glass pharmaceutical vial, and said base (500) substantially covers a bottom of said received glass pharmaceutical vial, thereby providing protection of the entirety of said glass pharmaceutical vial including said glass pharmaceutical vial's said top, said side wall and said bottom, against breakage of said glass pharmaceutical vial, while maintaining clear and non-distorted inspection of said glass pharmaceutical vial and its contents in their entirety.

2. A method of providing protection to glass pharmaceutical vials with said transparent silicone protective vial cover in claim 1,
    wherein said transparent silicone protective vial cover
    receives said glass pharmaceutical vial laterally via a distortion of said main cylindrical body (200) such that an opening is created at said circumferential side wall slit (420), and
    is moved fully within said circumferential side wall (400), which then substantially covers said side walls of said received glass pharmaceutical vial and extends past the said top of said glass pharmaceutical vial
    said glass pharmaceutical vial is subsequently directed longitudinally along said primary axis (100) until contact is made with said base (500) which now substantially covers a bottom of said glass pharmaceutical vial,
    with said circumferential side wall (400) providing sufficient flexure because of said circumferential side wall slit (420) and said base slit (520) to accommodate the outer diameter of said glass pharmaceutical vial, and
    said clear silicone bands (600) are stretched over the assemblage of said glass pharmaceutical vial and said transparent silicone protective vial cover, then
    allowed to constrict again so as to place a confining inward radial force against said main cylindrical body (200), thus
    securing said glass pharmaceutical vial from any separation from said transparent silicone protective vial cover,
    thereby resulting in said circumferential side wall (400) along with said base (500) and said clear silicone bands (600) providing protection of the entirety of said glass pharmaceutical vial including said glass pharmaceutical vial's top region, side wall regions and said bottom, against breakage of said glass pharmaceutical vial, while maintaining clear and non-distorted inspection of said glass pharmaceutical vial and its contents in their entirety.

* * * * *